(12) United States Patent
Murota (10) Patent No.: US 9,533,391 B2
(45) Date of Patent: Jan. 3, 2017

(54) TOOL EXCHANGER APPARATUS OF MACHINE TOOL

(71) Applicant: FANUC Corporation, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 189 days.

(21) Appl. No.: 14/480,937

(22) Filed: Sep. 9, 2014

(65) Prior Publication Data

US 2015/0072844 A1   Mar. 12, 2015

(30) Foreign Application Priority Data

Sep. 10, 2013   (JP) .................................. 2013-186981

(51) Int. Cl.
*B23Q 15/22*   (2006.01)
*B23Q 16/02*   (2006.01)
(Continued)

(52) U.S. Cl.
CPC ....... *B23Q 3/15526* (2013.01); *B23Q 11/0078* (2013.01); *B23Q 15/225* (2013.01); *B23Q 17/0904* (2013.01); *B23B 29/242* (2013.01); *B23Q 16/00* (2013.01); *B23Q 2003/15593* (2013.01); *B23Q 2220/002* (2013.01); *Y10T 29/5154* (2015.01); *Y10T 29/5155* (2015.01); *Y10T 74/1488* (2015.01); *Y10T 82/2506* (2015.01); *Y10T 483/11* (2015.01);
(Continued)

(58) Field of Classification Search
CPC .. Y10T 483/12; Y10T 483/123; Y10T 483/13; Y10T 483/136; Y10T 483/138; Y10T 483/11; Y10T 29/5154; Y10T 74/1488; B23Q 2003/15593
USPC ........ 483/4–5, 7, 10–11, 2; 29/39; 74/813 C
See application file for complete search history.

(56) References Cited

U.S. PATENT DOCUMENTS 5,339,504 A * 8/1994 Thumm ............... B23Q 16/102
                                                                29/48.5 A
9,339,905 B2 * 5/2016 Murota .............. B23Q 3/15706
(Continued)

FOREIGN PATENT DOCUMENTS

CN   102794670 A    11/2012
JP     3012496 U      6/1995
(Continued)

OTHER PUBLICATIONS

Machine Translation of JP 2005-205503-A, which JP '503 was published Aug. 2005.*
(Continued)

*Primary Examiner* — Erica E Cadugan
(74) *Attorney, Agent, or Firm* — Hauptman Ham, LLP (57) ABSTRACT

In a tool exchanger apparatus of a machine tool including a turret which turns around an axis inclining with respect to a vertical direction and which conveys tools, forces applied to tool gripping portions are calculated from a resultant force of a centrifugal force, gravity and an inertial force applied to each of the tools, using a weight and a position of each of the tools and a turning speed and a turning acceleration of the turret for each of turning phases when the turret turns, and the turning speed and the turning acceleration of the turret are determined for each of the turning phases.

4 Claims, 4 Drawing Sheets

(51) Int. Cl.
*B23Q 17/09* (2006.01)
*B23Q 11/04* (2006.01)
*B23B 29/24* (2006.01)
*B23Q 3/155* (2006.01)
*B23Q 11/00* (2006.01)
*B23Q 16/00* (2006.01)

(52) U.S. Cl.
CPC .......... *Y10T 483/123* (2015.01); *Y10T 483/13* (2015.01); *Y10T 483/136* (2015.01); *Y10T 483/1809* (2015.01); *Y10T 483/1882* (2015.01)

(56) References Cited

U.S. PATENT DOCUMENTS

| | | |
|---|---|---|
| 2012/0299232 A1 | 11/2012 | Kawamura et al. |
| 2015/0072845 A1* | 3/2015 | Murota .............. B23Q 3/15706 483/7 |

FOREIGN PATENT DOCUMENTS

| | | |
|---|---|---|
| JP | H08-115113 A | 5/1996 |
| JP | 2005-205503 A | 8/2005 |
| JP | 2005-224896 A | 8/2005 |
| JP | 3883027 b2 | 2/2007 |

OTHER PUBLICATIONS

Decision to Grant a Patent mailed Apr. 7, 2015, corresponding to Japanese patent application No. 2013-186981.

* cited by examiner

TOOL EXCHANGER APPARATUS OF MACHINE TOOL

RELATED APPLICATIONS

The present application claims priority to Japanese Application Number 2013-186981, filed Sep. 10, 2013, the disclosure of which is hereby incorporated by reference herein in its entirety.

BACKGROUND OF THE INVENTION

Field of the Invention

The present invention relates to a tool exchanger apparatus of a machine tool for indexing a tool by turning motion of a turret.

Description of the Related Art

A tool exchanger apparatus for automatically changing tools mounted on a main shaft of a machine tool is conventionally used. A plurality of tools required for an operation is set, in advance, in the tool exchanger apparatus, and the tool mounted on the main shaft of the machine tool is automatically changed to another tool designated in accordance with a machining state.

In such a tool exchanger apparatus, the tools are conveyed by the turning motion of the turret, but when the turning motion is carried out for conveying the tool, it is necessary to prevent the tool from falling off.

Hence, the following techniques to prevent a tool from falling off are known.

Japanese Patent Application Laid-Open No. 8-115113 discloses a technique in which a machine tool includes a weight data storage, weight data of tools which is input by a data inputting portion is stored in the weight data storage, and an operation of a turret of the machine tool is controlled based on the weight data.

Japanese Patent Application Laid-Open No. 2005-205503 discloses a technique in which, when a turret which conveys a tool of a machine tool is turned, a centrifugal force applied to the tool is estimated, and a maximum turning speed is determined based on the estimated centrifugal force and a gripping force on the tool in a tool gripping portion of the turret.

According to the techniques disclosed in Japanese Patent Application Laid-Open No. 8-115113 and Japanese Patent Application Laid-Open No. 2005-205503, by appropriately setting the turning speed of the turret at the time of the indexing operation of a tool based on the weight data of the tool and the centrifugal force applied to the tool, it is possible not only to prevent the tool from falling off, but also to shorten a tool changing time. According to the techniques disclosed in Japanese Patent Application Laid-Open No. 8-115113 and Japanese Patent Application Laid-Open No. 2005-205503, however, the turning speed is constant with respect to a weight of a tool on the turret. However, when a turning axis of the turret inclines with respect to a vertical direction, a direction with respect to the axis of a weight applied to the tool changes in accordance with a turning phase of the turret. Accordingly, if the turret is turned at a constant speed, there may be a margin with respect to a limit speed of a turning motion depending upon the turning phase, resulting in insufficient reduction in tool changing time.

SUMMARY OF THE INVENTION

Hence, it is an object of the present invention to provide a tool exchanger apparatus of a machine tool which is capable of sufficiently shortening a tool changing time.

The tool exchanger apparatus of a machine tool according to the present invention includes a turret which turns around an axis inclining with respect to a vertical direction and which conveys tools, and the turret includes a plurality of radially arranged tool gripping portions.

A first aspect of the tool exchanger apparatus includes: a force calculating portion which includes tool weight data of the tools attached to the tool gripping portions of the turret and tool placement data of the tools in the tool gripping portions, and which calculates forces applied to each of the tool gripping portions from a resultant force of a centrifugal force, gravity and an inertial force applied to each of the tools, using a weight and a position of each of the tools and a turning speed and a turning acceleration of the turret for each of turning phases when the turret turns, based on the tool weight data and the tool placement data; a maximum force calculating portion which calculates a maximum force from among forces applied to the tool gripping portions calculated by the force calculating portion; a turret turning motion determining portion which, in advance, sets target values of forces applied to the tool gripping portions, and which determines the turning speed and the turning acceleration of the turret for each of the turning phases, such that the maximum force calculated by the maximum force calculating portion falls within a predetermined range with respect to the target value for each of phases when the turret turns; and a controller which turns the turret in accordance with set values of the turning speed and the turning acceleration for each of the turning phases determined by the turret turning motion determining portion.

According to the tool exchanger apparatus of the first aspect, a force applied to each of the tool gripping portions is calculated, a speed and an acceleration are determined for each of the turning phases of the turret, and the turret is turned. Therefore, it is possible to set an optimal speed and an optimal acceleration for each of the turning phases without being limited by the speed and the acceleration at a low limit. Hence, it is possible to further shorten the tool changing time.

A second aspect of the tool exchanger apparatus includes: load sensors which detect magnitude of forces applied to the tool gripping portions when the turret turns; a maximum force calculating portion which calculates a maximum force from among forces applied to the tool gripping portions detected by the load sensors; a turret turning motion determining portion which, in advance, sets target values of forces applied to the tool gripping portions, and which determines a turning speed and a turning acceleration of the turret for each of the turning phases, such that the maximum force calculated by the maximum force calculating portion falls within a predetermined range with respect to the target value for each of phases when the turret turns; and a controller which turns the turret in accordance with set values of the turning speed and the turning acceleration for each of the turning phases determined by the turret turning motion determining portion.

According to the tool exchanger apparatus of the second aspect, each of the tool gripping portions is provided with a load sensor which detects magnitude of a force applied to the tool gripping portion, a speed and an acceleration are determined for each of the turning phases of the turret in accordance with a result of detection of the load sensor, and the turret is turned. Therefore, it is possible to set an optimal speed and an optimal acceleration for each of the turning phases without being limited by the speed and acceleration at a low limit. Hence, it is possible to further shorten the tool changing time.

The present invention has the above-described configuration. Therefore, it is possible to provide a tool exchanger apparatus of a machine tool which is capable of sufficiently shortening the tool changing time.

BRIEF DESCRIPTION OF THE DRAWINGS

These and other objects and features of the present invention will become clear by the following description of embodiments with reference to the accompanying drawings.

DETAILED DESCRIPTION OF THE PREFERRED EMBODIMENTS

First, a first embodiment of a tool exchanger apparatus of a machine tool according to the present invention will be described with reference to FIGS. 1 to 4.

Figure 1:
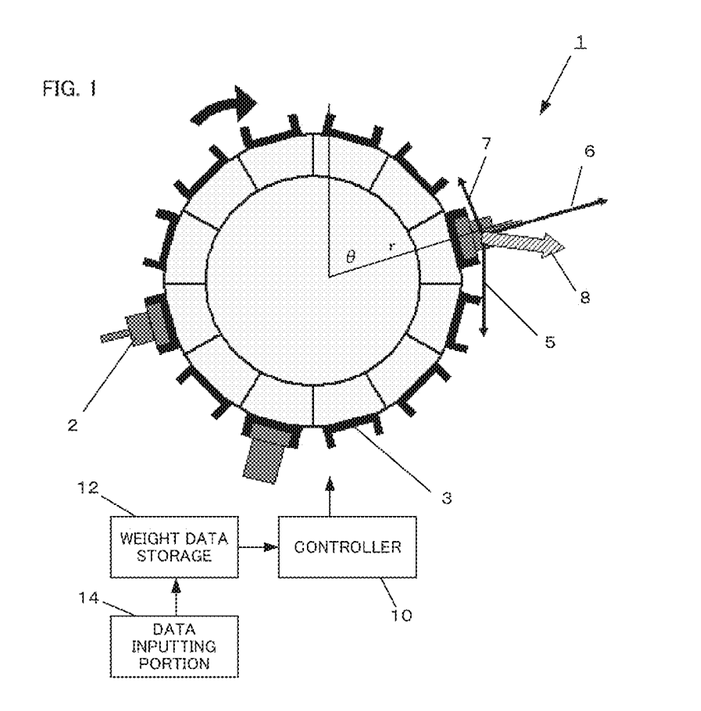
FIG. 1 is a schematic diagram of a structure of a turret used in a first embodiment of a tool exchanger apparatus according the present invention.

FIG. 1 is a schematic diagram of a structure of a turret used in the tool exchanger apparatus of the first embodiment.

The turret 1 includes a plurality of (12 in FIG. 1) tool gripping portions 3 which is radially arranged around the turret 1. Tools 2 are gripped, as necessary, by some of the tool gripping portions 3. The turret 1 is configured to turn clockwise.

When a command for exchanging tools is issued to a controller 10 of the machine tool, the turret 1 is turned clockwise so that the turret 1 reaches a tool exchanging position which is set at any of turning positions of the turret 1 (hereinafter this motion may be referred to as "indexing operation", in some cases). When the turret 1 is turned at the time of this indexing operation, a large force may be applied to the tool gripping portion 3 and the tool 2 falls off if a turning speed or an acceleration is excessively high.

In FIG. 1, a reference numeral 8 denotes a resultant force in which gravity 5, a centrifugal force 6 and an inertial force 7 are vectorially applied to a tool 2. In the first embodiment, weights of the tools 2 to be mounted on the tool gripping portions 3 and placement data of the tools 2 in the tool gripping portions 3 are stored, in advance, in a weight data storage 12 by input from a data inputting portion 14. The controller 10 calculates the resultant force 8 of the gravity 5, the centrifugal force 6 and the inertial force 7 applied to the tool 2 for each of turning phases of the turret 1, based on weights of the tools 2 stored in the weight data storage 12, placement data of the tools 2 in the tool gripping portions 3, and the turning phase, the turning speed and the turning acceleration of the turret 1. Subsequently, the controller 10 calculates a force applied to each of the tool gripping portions 3.

The force applied to each of the tool gripping portions 3 of each of the tools 2 is calculated for each of the turning phases of the turret 1, and a turning speed and a turning acceleration of the turret 1 are determined such that a force applied to the tool gripping portion 3 becomes an appropriate value. Turning motion of the turret 1 is adjusted based on the turning speed and the turning acceleration determined for each of the turning phases of the turret 1. Accordingly, the turning speed and the turning acceleration of the turret 1 are controlled such that a force applied to the tool gripping portion 3 becomes an appropriate value, and it is possible to prevent the tool 2 from falling off, and to turn the turret 1 at an optimal turning speed and an optimal turning acceleration.

Next, an example of a method of determining an appropriate turning speed and turning acceleration for each of turning phases of the turret 1 will be described.

First, a method of calculating a force applied to the tool gripping portion 3 from weights of tools 2 stored in the weight data storage 12 and placement data of tools 2 in the tool gripping portions 3 will be described. Here, it is assumed that a turning axis of the turret 1 is oriented to a horizontal direction.

It is assumed that numbers 1, 2, . . . n are assigned in sequence to the tool gripping portions 3 provided around a periphery of the turret 1, and tools having weights $m_1$, $m_2$, . . . $m_n$ are mounted on the respective tool gripping portions 3. It is also assumed that a distance between the center of gravity of the tool 2 and the turning axis of the turret 1 is r. If the tool 2 having the weight $m_1$ is located at a position which is rotated from an uppermost portion of the turret 1 by θ and a turning speed and a turning acceleration of the turret 1 are ω and α, respectively, then gravity, a centrifugal force and an inertial force applied to the tool 2 having the weight $m_1$ are $m_1 g$, $m_1 r^2 \omega$, and $m_1 r \alpha$, respectively. A resultant force applied to the tool 2 can be obtained as a vector sum of the gravity $m_1 g$, the centrifugal force $m_1 r^2 \omega$ and the inertial force $m_1 r \alpha$. Magnitude of the vector $F_1$ obtained as the resultant force is defined as a force applied to the tool gripping portion 3. Concerning the tools 2 having the weights $m_2$, $m_3$, . . . , forces $F_2$, $F_3$, . . . $F_n$ applied to the tool gripping portions 3 can also be calculated in the same manner.

Next, a method of determining a turning speed and a turning acceleration in the turning motion of the turret 1, based on the forces $F_1$, $F_2$, . . . $F_n$ applied to the tool gripping portions 3 calculated in the above manner will be described.

Figure 2:
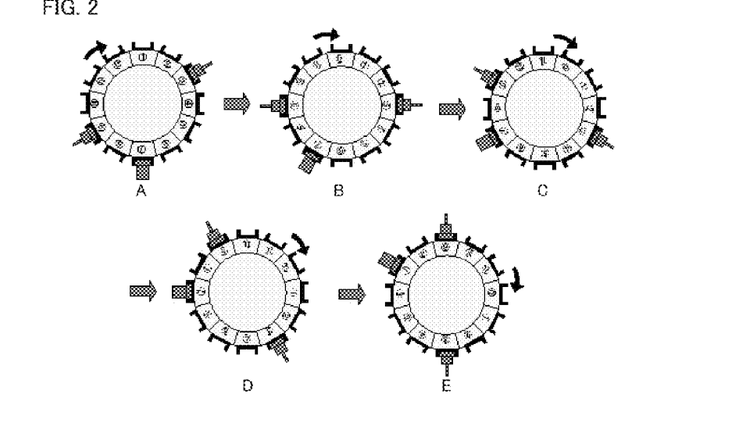
FIG. 2 is a diagram showing an example of turning motion of the turret shown in FIG. 1.

Here, a turning speed and a turning acceleration of each of turning phases mean a turning speed and a turning acceleration of respective turning phases in positions having different turning phases of the turret 1, such as a position A, a position B, . . . a position E in FIG. 2. Although five positions, i.e., the position A, the position B, . . . the position E are indicated as the positions having different turning phases in an example shown in FIG. 2, this is just an example, and it is possible to freely choose the number of turning phases and the phase differences at which the turning speed and the turning acceleration are determined.

FIG. 2 shows positions of the turret 1 having different turning phases. Since the turret 1 rotates clockwise, the turret 1 rotates while changing a turning phase in the order of the position A, the position B, . . . the position E. For example, to obtain a turning speed and a turning acceleration when a turning phase of the turret 1 is the position A, a resultant force is calculated from gravity, a centrifugal force and an inertial force applied to the tool 2 for each of tools 2 mounted on the tool gripping portions 3. Subsequently, a force applied to the tool gripping portion 3 is calculated. The force is calculated for each of the tools 2, and the turning speed and the turning acceleration when the turning phase of the turret 1 is the position A are adjusted such that a difference between a force applied to the tool gripping portion 3 which is the largest in the calculated forces and a target value F which is set with respect to preset strength of the tool gripping portion 3 becomes not more than a certain value.

Next, a further specific method of calculating a force applied to the tool gripping portion 3 will be described.

A permissible error dF between a target value F of a force applied to the tool gripping portion 3 and a force F applied to the tool gripping portion 3 after the turning speed is adjusted, and a changing step width dω when the turning speed is adjusted are determined in advance. Here, F is set as a value which is sufficiently safe with respect to strength of the tool gripping portion 3, and values of dF and dω are values determined by taking performance of the controller 10 into consideration.

An initial set value of a speed ω in FIG. 2 is determined. As one example, the initial set value can be an appropriate value, such as a value which is the same as a speed pattern when turning motion of a conventional style is carried out. The speed value determined as the initial set value is changed based on a calculated value of a force applied to the tool gripping portion 3, and an optimized speed value is used for actual turning motion.

First, from a speed pattern which is set as the initial setting, an accelerations α in the position A, the position B, . . . the position E are calculated. When an angle between the positions is defined as φ, for example, a time t for moving between the positions is defined as φ/ω$_1$. Based on these, the acceleration α can be obtained in accordance with α$_i$=(ω$_{i+1}$−ω$_i$)/t.

Next, forces F$_1$ to F$_{12}$ applied to the tool gripping portions 3 are calculated based on a speed ω$_A$ and an acceleration α$_A$ at the position A, a tool weight, and tool placement in the tool gripping portion 3. A maximum value of the forces F$_1$ to F$_{12}$ applied to the tool gripping portions 3 at the position A is denoted by F$_{max}$. Here, when F$_{max}$>F, the speed ω at the position A is changed to a value obtained by subtracting dω from the speed ω. If F$_{max}$<F on the contrary, the speed ω$_A$ is increased by dω. This calculating operation of F$_{max}$ and the changing operation of the speed ω are also carried out in sequence for the positions B to E.

As the speed pattern at the time of the turning motion is changed, values of accelerations α$_A$ to α$_E$ are also changed. If the speeds are changed, the values of the accelerations α$_A$ to α$_E$ at the positions A to E are again calculated based on a relation between the phase and the speed. Based on the speed ω and the acceleration α which are changed in this manner, F$_1$ to F$_{12}$ are again calculated for the positions A to E, F$_{max}$ is obtained and compared with F, and speed ω is changed.

This operation is repeated until a difference between F$_{max}$ and F becomes equal to or smaller than the permissible error dF in all of the positions A to E. When the difference between F$_{max}$ and F becomes equal to or smaller than dF in all of the positions A to E, the speed ω and the acceleration α in each of the positions A to E are defined as values which are used for actual turning motion in the turning phases.

Figure 3:
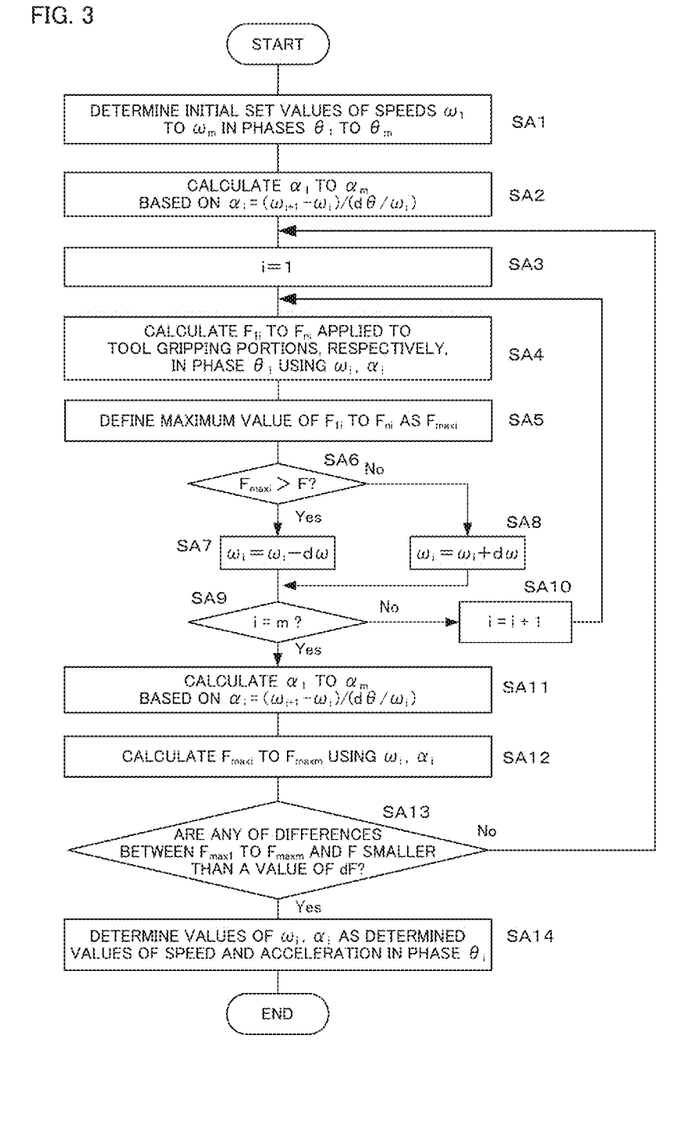
FIG. 3 is a flowchart for describing a flow of processing for determining a turning speed and a turning acceleration of the turret shown in FIG. 1.

FIG. 3 is a flowchart showing a flow of calculation procedure of a turning speed and a turning acceleration for each of the turning phases of the turret 1. The procedure will be described in accordance with steps.

(Step SA1) As positions of the turret for determining the turning speed and turning acceleration, m positions are determined and initial set values of turning speeds ω$_1$ to ω$_m$ in respective phases θ$_1$ to θ$_m$ are appropriately determined.

(Step SA2) Values of turning accelerations α$_1$ to α$_m$ in the respective phases θ$_1$ to θ$_m$ are calculated in sequence in accordance with α$_i$=(ω$_{i+1}$−ω$_i$)/(dθ/ω$_i$). However, the turning acceleration α$_m$ in the phase θm$_m$ is calculated in accordance with α$_m$=(ω$_1$−ω$_m$)/(dθ/ω$_m$).

(Step SA3) i is set to 1.

(Step SA4) Forces F$_{1i}$ to F$_{ni}$ applied to each of the tool gripping portions in the phase θ$_i$ are calculated based on the turning speed ω$_i$ and the turning acceleration α$_i$. To obtain F$_{1i}$, more specifically, gravity m$_1$g, a centrifugal force m$_1$r$^2$ θ and an inertial force m$_1$rα are obtained using a weight m$_1$ of a tool which is gripped at a first position of the tool gripping portion, and magnitude of a vector sum of these values is defined as F$_{1i}$. Forces are calculated in the same manner also for second, third, . . . n-th positions of the tool gripping portion.

(Step SA5) A maximum value of F$_{1i}$ to F$_{ni}$ obtained in step SA4 is defined as F$_{maxi}$.

(Step SA6) The maximum value F$_{maxi}$ obtained in step SA5 is compared with a value of F which is set as a target value of a force applied to the tool gripping portion, and it is determined whether F$_{maxi}$ is greater than F or not. If F$_{maxi}$ is greater than F (YES), the procedure proceeds to step SA7. If F$_{maxi}$ is equal to or smaller than F (NO), the procedure proceeds to step SA8.

(Step SA7) A step value when the turning speed of the turret is changed is denoted by dω, and a value of ω$_1$ is reduced by dω.

(Step SA8) A value of ω$_i$ is increased by dω.

(Step SA9) It is determined whether a value of i is equal to m or not. If i is equal to m (YES), the procedure proceeds to step SA11; and if not (NO), the procedure proceeds to step SA10.

(Step SA10) One (1) is added to the value of i, and the procedure returns to step SA4.

(Step SA11) Using the values of ω$_1$ to ω$_m$ which have already been corrected in step SA7 or SA8, values of the turning accelerations α$_1$ to α$_m$ in the respective phases θ$_1$ to θ$_m$ are calculated in sequence in accordance with α$_i$=(ω$_{i+1}$−ω$_i$)/(dθ/ω$_i$). However, the turning acceleration α$_m$ in the phase θ$_m$ is calculated in accordance with α$_m$=(ω$_1$−ω$_m$)/(dθ/ω$_m$).

(Step SA12) Forces F$_{1i}$ to F$_{ni}$ applied to the tool gripping portions in the phase θ$_i$ are calculated based on ω$_i$ and α$_i$, a maximum value thereof is extracted, and F$_{max1}$ to F$_{maxm}$ are calculated.

(Step SA13) It is determined whether or not differences between F$_{max1}$ to F$_{maxm}$ and F are smaller than a value of dF which is set as a permissible error with respect to F. If all of the differences are smaller than dF (YES), the procedure proceeds to step SA14. If any of the differences is equal to or higher than dF (NO), the procedure returns to step SA3, and F$_{max1}$ to F$_{maxm}$ are again calculated.

(Step SA14) Values of ω$_i$ and α$_i$ are defined as determined values of the speed and the acceleration in the phase θ$_i$, and this procedure is completed.

According to the above-described procedure, it is possible to determine an appropriate turning speed and turning acceleration for each of turning phases of the turret 1. When the turret 1 actually turns, a turning motion of the turret 1 is adjusted based on the turning speed and the turning acceleration which are determined in this manner.

Figure 4:
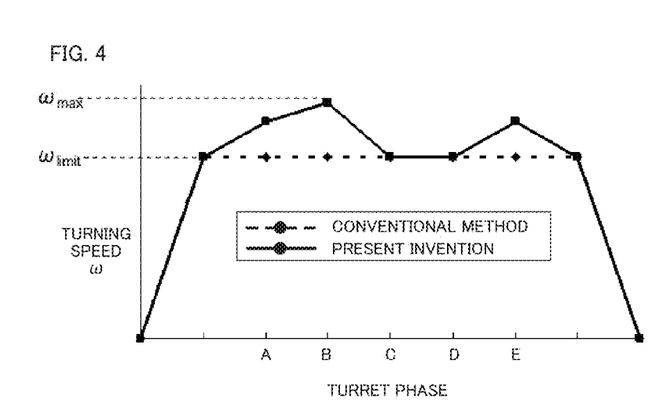
FIG. 4 is a graph showing, in comparison with conventional techniques, variation of a turning speed determined concerning the turret shown in FIG. 1 for each of turning phases.

FIG. 4 is a graph showing variation of a turning speed for each of turning phases determined in the first embodiment.

In the conventional techniques, a turning speed of a turret when tools are exchanged is fixed to a constant value (turning speed $\omega_{limit}$) in phases A, B, . . . E from which a phase immediately after a turning motion is started and a phase immediately before the turning motion is completed are removed as shown by dotted lines in FIG. 4. This turning speed $\omega_{limit}$ corresponds to a limit turning speed in a phase where $F_{max}$ becomes a maximum value.

On the other hand, in the first embodiment, for each of turning phases of the turret, the turning speed of the turret is adjusted such that the maximum value $F_{max}$ of a force applied to the tool gripping portion becomes a value close to F which is set as a target value. As a result, in this embodiment, it is possible to turn the turret at a higher speed than those of the conventional techniques in the phases B and E, as shown in the graph in FIG. 4.

In turning phases where a turning speed is sufficient in the conventional techniques, it is possible to increase the turning speed to its limit in the first embodiment. Therefore, it is possible to shorten the tool changing time as a whole.

Forces applied to all of the tool gripping portions 3 which are gripping the tools are calculated in the first embodiment. However, if calculation of the forces takes time, it is possible to calculate forces applied only to some of the tool gripping portions 3 excluding one or more tool gripping portions 3 to which an apparently small force is applied, and to calculate a turning speed and a turning acceleration of each of the turning phases. In this case, it is necessary to properly select the tool gripping portions 3 whose force is not to be calculated, but it is possible to calculate the turning speed and the turning acceleration in a shorter time.

Next, a second embodiment of the tool exchanger apparatus of the machine tool according to the present invention will be described with reference to FIGS. 5 and 6.

The second embodiment is different from the first embodiment in that load sensors 20 are provided to respective tool gripping portions 3 so that forces applied to the tool gripping portions 3 are measured by means of the load sensors 20, instead of calculating magnitude of a force applied to each of tool gripping portions 3 based on a weight and a position of a tool 2 mounted on each of the tool gripping portions 3 and a turning speed and a turning acceleration of a turret 1.

Figure 5:
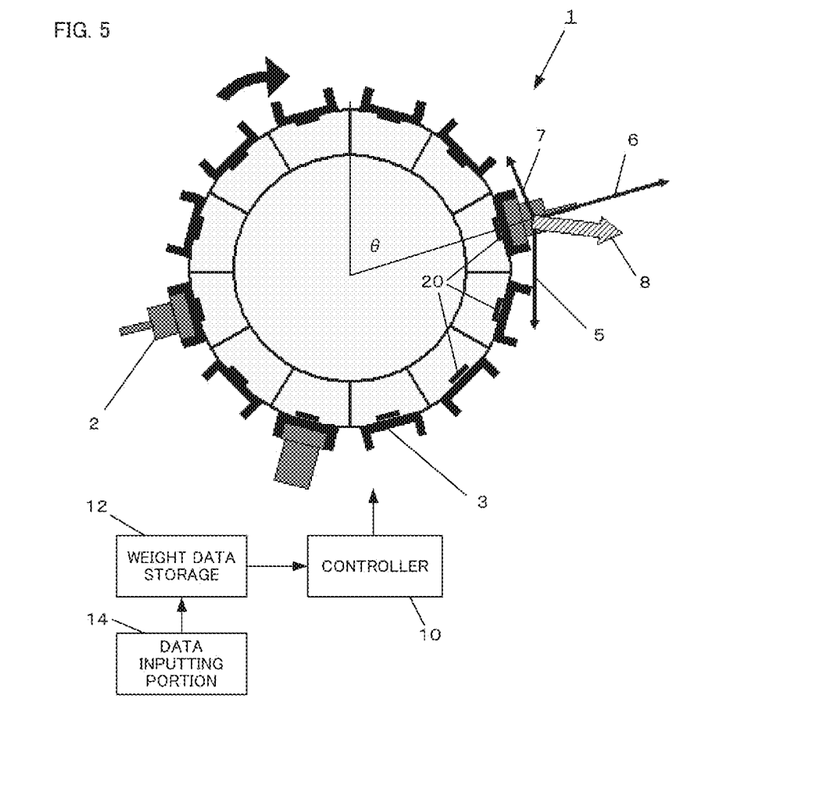
FIG. 5 is a schematic diagram of a structure of a turret used in a second embodiment of the tool exchanger apparatus according the invention.

FIG. 5 is a schematic diagram of a structure of the turret used in the tool exchanger apparatus of the second embodiment.

As shown in FIG. 5, the load sensor 20 is mounted on a bottom surface of each of the tool gripping portions 3, and a force applied to each of the tool gripping portions 3 is measured using the load sensor 20 for each of the turning phases of the turret 1. An installation location of the load sensor 20 is not limited to the bottom surface of the tool gripping portion 3, and the installation location can appropriately be determined.

As described above, a force applied to the tool gripping portion 3 is measured by the load sensor 20 for each of the turning phases of the turret 1, and a turning speed and a turning acceleration of the turret 1 are determined so that the force applied to the tool gripping portion 3 becomes an appropriate value. Subsequently, a turning motion of the turret 1 is adjusted base on the turning speed and the turning acceleration determined for each of the turning phases of the turret 1. Accordingly, the turning speed and the turning acceleration of the turret 1 are controlled such that the force applied to the tool gripping portion 3 becomes an appropriate value, and it is possible to prevent a tool 2 from falling off while turning the turret 1 at an optimal turning speed and an optimal turning acceleration.

Figure 6:
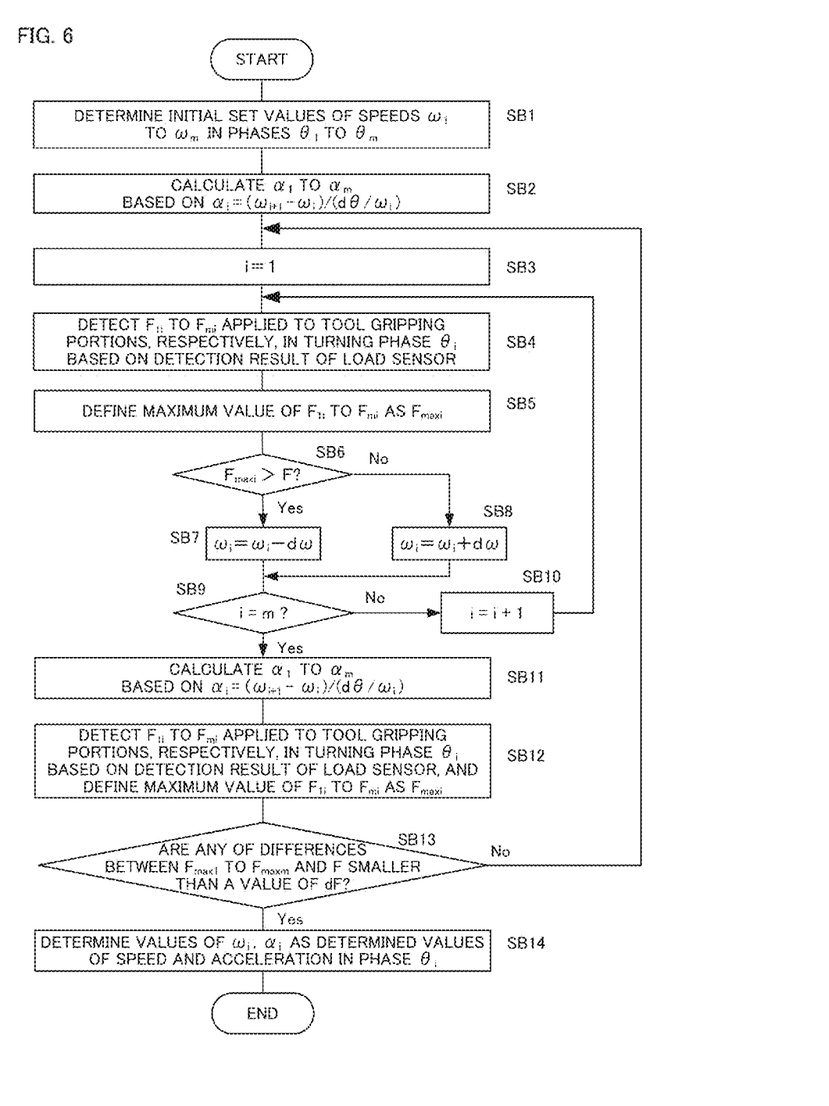
FIG. 6 is a flowchart for describing a flow of processing for determining a turning speed and a turning acceleration of the turret shown in FIG. 5.

FIG. 6 is a flowchart showing a flow of calculation procedure of a turning speed and a turning acceleration for each of the turning phases of the turret 1. The procedure will be described in accordance with steps:

(Step SB1) As positions of the turret for determining the turning speed and turning acceleration, m positions are determined and initial set values of turning speeds $\omega_1$ to $\omega_m$ in respective phases $\theta_1$ to $\theta_m$ are appropriately determined.

(Step SB2) Values of turning accelerations $\alpha_1$ to $\alpha_m$ in the respective phases $\theta_1$ to $\theta_m$ are calculated in sequence in accordance with $\alpha_i=(\omega_{i+1}-\omega_i)/(d\theta/\omega_i)$. However, the turning acceleration $\alpha_m$ in the phase $\theta_m$ is calculated in accordance with $\alpha_m=(\omega_1-\omega_m)/(d\theta/\omega_m)$.

(Step SB3) i is set to 1.

(Step SB4) Forces $F_{1i}$ to $F_{mi}$ applied to each of the tool gripping portions in the phase $\theta_i$ are calculated based on detection results of the load sensors.

(Step SB5) A maximum value of $F_{1i}$ to $F_{mi}$ obtained in step SB4 is defined as $F_{maxi}$.

(Step SB6) The maximum value $F_{maxi}$ obtained in step SB5 is compared with a value of F which is set as a target value of a force applied to the tool gripping portion, and it is determined whether $F_{maxi}$ is greater than F or not. If $F_{maxi}$ is greater than F (YES), the procedure proceeds to step SB7. If $F_{maxi}$ is equal to or smaller than F (NO), the procedure proceeds to step SB8.

(Step SB7) A step value when the turning speed of the turret is changed is denoted as $d\omega$, and a value of $\omega_1$ is reduced by $d\omega$.

(Step SB8) A value of $w_i$ is increased by $d\omega$.

(Step SB9) It is determined whether a value of i is equal to m or not. If i is equal to m (YES), the procedure proceeds to step SB11; and if not (NO), the procedure proceeds to step SB10.

(Step SB10) One (1) is added to the value of i, and the procedure returns to step SB4.

(Step SB11) Using the values of $\omega_1$ to $\omega_m$ which have already been corrected in step SB7 or SB8, values of the turning accelerations $\alpha_1$ to $\alpha_m$ in the respective phases $\theta_1$ to $\theta_m$ are calculated in sequence in accordance with $\alpha_i=(\omega_{i+1}-\omega_i)/(d\theta/\omega_i)$. However, the turning acceleration $\alpha_m$ in the phase $\theta_m$ is calculated in accordance with $\alpha_m=(\omega_1-\omega_m)/(d\theta/\omega_m)$.

(Step SB12) Forces $F_{1i}$ to $F_{mi}$ applied to the tool gripping portions in the phase $\theta_i$ are detected based on detection results of the load sensors, and a maximum value thereof is defined as $F_{maxi}$.

(Step SB13) It is determined whether or not differences between $F_{max1}$ to $F_{maxm}$ and F are smaller than a value of dF which is set as a permissible error with respect to F. If all of the differences are smaller than dF (YES), the procedure proceeds to step SB14. If any of the differences is equal to or higher than dF (NO), the procedure returns to step SB3, and $F_{max1}$ to $F_{maxm}$ are again calculated.

(Step SB14) Values of $\omega_i$ and $\alpha_i$ are defined as determined values of the speed and the acceleration in the phase $\theta_i$, and this procedure is completed.

The invention claimed is:

1. A tool exchanger apparatus of a machine tool comprising a turret which turns around an axis inclining with respect to a vertical direction and which conveys tools, wherein
the turret includes a plurality of radially arranged tool gripping portions, and
the tool exchanger apparatus comprises:
a force calculating portion which includes tool weight data of the tools attached to the tool gripping portions of the turret and tool placement data of the tools in the tool gripping portions, and which calculates forces applied to each of the tool gripping portions from a resultant force of a centrifugal force, gravity and an inertial force applied to each of the tools, using a weight and a position of each of the tools and a turning speed and a turning acceleration of the turret for each of positions in a turning direction of the turret when the turret turns, based on the tool weight data and the tool placement data;
a maximum force calculating portion which calculates a maximum force from among forces applied to the tool gripping portions calculated by the force calculating portion;
a turret turning motion determining portion which, in advance, sets target values of forces applied to the tool gripping portions, and which individually determines the turning speed of the turret for each of the positions in the turning direction, and which individually determines the turning acceleration of the turret for each of the positions in the turning direction, such that the maximum force calculated by the maximum force calculating portion falls within a predetermined range with respect to the target value for each of the positions in the turning direction when the turret turns; and
a controller which turns the turret in accordance with set values of the turning speed and the turning acceleration, for each of the positions in the turning direction, determined by the turret turning motion determining portion.

2. A tool exchanger apparatus of a machine tool comprising a turret which turns around an axis inclining with respect to a vertical direction and which conveys tools, wherein
the turret includes a plurality of radially arranged tool gripping portions, and
the tool exchanger apparatus comprises:
load sensors which detect magnitude of forces applied to the tool gripping portions when the turret turns;
a maximum force calculating portion which calculates a maximum force from among forces applied to the tool gripping portions detected by the load sensors;
a turret turning motion determining portion which, in advance, sets target values of forces applied to the tool gripping portions, and which individually determines a turning speed of the turret for each of positions in a turning direction of the turret, and which individually determines a turning acceleration of the turret for each of the positions in the turning direction, such that the maximum force calculated by the maximum force calculating portion falls within a predetermined range with respect to the target value for each of the positions in the turning direction when the turret turns; and
a controller which turns the turret in accordance with set values of the turning speed and the turning acceleration, for each of the positions in the turning direction, determined by the turret turning motion determining portion.

3. The tool exchanger apparatus 2, wherein the respective force applied to each respective one of the tool gripping portions is measured by a respective one of the load sensors for each of the positions in a turning direction of the turret.

4. The tool exchanger apparatus 2, each of the load sensors is mounted on a respective radially inner surface of a respective one of the tool gripping portions.

* * * * *